United States Patent [19]

Ophir

[11] Patent Number: 5,630,971
[45] Date of Patent: May 20, 1997

[54] METHOD AND APPARATUS FOR MANUFACTURING BOBBINS

[75] Inventor: Zohar Ophir, Haifa, Israel

[73] Assignee: State of Israel, Ministry of Defence Rafael-Armaments Development Authority, Israel

[21] Appl. No.: 248,486

[22] Filed: May 24, 1994

[30] Foreign Application Priority Data

Jun. 1, 1993 [IL] Israel .......................... 105876

[51] Int. Cl.⁶ .................... B29C 45/02; B29C 45/73
[52] U.S. Cl. ................ 264/101; 264/102; 264/234; 264/346
[58] Field of Search ..................... 264/101, 102, 264/510, 511, 513, 234, 345

[56] References Cited

U.S. PATENT DOCUMENTS

| | | | |
|---|---|---|---|
| 4,174,367 | 11/1979 | Breher | 264/261 |
| 4,876,050 | 10/1989 | Horton | 264/102 |
| 4,995,698 | 2/1991 | Myers . | |
| 5,228,186 | 7/1993 | Brettell et al. | 264/272.18 |
| 5,261,980 | 11/1993 | Pearce | 264/102 |

FOREIGN PATENT DOCUMENTS

| | | |
|---|---|---|
| 0058555 | 8/1982 | European Pat. Off. . |
| 3714042 | 11/1988 | Germany . |
| 2-30508 | 1/1990 | Japan . |

*Primary Examiner*—Catherine Timm
*Attorney, Agent, or Firm*—Merchant, Gould, Smith, Edell, Welter & Schmidt

[57] ABSTRACT

A method of manufacturing a bobbin made essentially or partially of a curable resin comprises the steps of: a) providing a mold consisting of a male portion and of a female portion, the gap left between the said female and the male portions, in their operational mounted position, being of the shape and dimensions of the bobbin which it is desired to produce, the mold being provided with a resin inlet and vacuum port in communication with the gap; (b) laying on the surface of the male part of the mold, or winding thereon, any element or material which it is desired to embed within the resin; c) inserting the male part of the mold into the female part thereof and securely connecting the two parts, the two parts, when connected, being essentially sealed against pressure loss along their contact surfaces; d) causing a curable resin to flow into the gap through the resin inlet, while applying a vacuum at the vacuum port, until the empty space provided within the gap is substantially entirely filled with resin; e) allowing the resin to solidify; and f) opening the mold and removing the bobbin from the male part thereof.

11 Claims, 5 Drawing Sheets

METHOD AND APPARATUS FOR MANUFACTURING BOBBINS

FIELD OF THE INVENTION

The present invention relates to a process and apparatus for manufacturing bobbins made of composite materials. More particularly, the invention relates to an industrial process for manufacturing bobbins adapted to support wound filaments, particularly for optical fibers.

BACKGROUND OF THE INVENTION

It is well known in the art to provide bobbins onto which there are wound filaments to be paid out from the bobbin at a later time. One particularly interesting example of filament is the optical fiber. Optical fibers are used as communication links between moving objects and control stations, because it is possible to wind a very long fiber, of the order of kilometers, on a relatively small bobbin, and to transmit data along the fiber at a high rate. Optical fiber canisters of this type, including an optical fiber wound on a bobbin, are used in a variety of applications, e.g., for communication purposes. Throughout this specification reference will be therefore made to optical fibers, it being understood that the same applies, mutatis mutandis, to other filaments as well.

Bobbins adapted to be used as a base for optical fiber canisters can be made in a variety of ways and from different materials. For instance, they may be of aluminum, or can be made of composite material, such as described in U.S. Pat. No. 4,995,698. However, all prior art manufacturing processes suffer from substantial drawbacks. In the case of aluminum bobbins, for instance, it is necessary to work the surface of the bobbin in order to produce the threaded grooved surface which is commonly required in order to lay the first layer of optical fiber. Alternatively, the surface may be prepared for this purpose by other methods, e.g., by winding first a base wire which creates the grooved surface.

In the case of a composite bobbin such as that made according to the aforesaid U.S. patent, surface finishing is also needed, in order to smooth out inequalities of the surface which may have greatly undesirable effect on the winding of the optical fiber, and to provide the required grooved surface. Additionally, the bobbin normally is made by stages, the first one being manufacturing the main body which is frusto-conical in shape. However, additional elements must be provided, e.g., for fastening the bobbin onto the body from which the optical fiber is paid out. This is normally achieved by providing anchoring means, e.g., a ring, connected to the larger diameter of the bobbin. This of course requires an additional operation, unless the bobbin is made of cast material, e.g., aluminium, in which case it is possible to create the desired anchoring means integrally with the body of the bobbin.

As a result of the aforesaid problems, production of bobbins of this type requires a number of steps, and the surface of the bobbin may suffer from irregularities due to machining thereof.

Another drawback of prior art methods is that they are relatively limited in the choice of construction materials and in the tailoring of the properties required of the bobbin, as will be more fully explained hereinafter.

It is an object of the present invention to provide a method for manufacturing bobbins of this type, which is free from the aforesaid drawbacks of prior art methods.

It is another object of the invention to provide a method by means of which a bobbin can be produced in an automated process providing a product of constant high quality.

It is still further object of the invention to provide a production method which is flexible as far as the construction materials and the properties of the bobbin are concerned. Other objects of the invention will become apparent as the description proceeds.

SUMMARY OF THE INVENTION

The method of manufacturing a bobbin made essentially or partially of a curable resin, according to the invention, comprises the steps of:

a) providing a mold consisting of a male portion and of a female portion, the gap left between the said female and the said male portions, in their operational mounted position, being of the shape and dimensions of the bobbin which it is desired to produce, the said mold being provided with a resin inlet and vacuum port in communication with the said gap;

b) laying on the surface of the male part of the mold, or winding thereon, any element or material which it is desired to embed within the resin;

c) inserting the male part of the mold into the female part thereof and securely connecting the said two parts, the said two parts, when connected, being essentially sealed against pressure loss along their contact surfaces;

d) causing a curable resin to flow into the said gap through the resin inlet, while applying a vacuum at the vacuum port, until the empty space provided within the said gap is substantially entirely filled with resin;

e) allowing the resin to solidify; and f) opening the mold and removing the bobbin from the male part thereof.

The material which it is desired to embed within the resin may be of any suitable type. According to a preferred embodiment of the invention, this material comprises one or more fiber(s). Illustrative, but non-limitative, examples of suitable fibers include carbon fibers, such as graphite, aramid fibers, such as Kevlar, glass fibers, such as quartz, ceramic fibers and polyethylene fibers.

The resin, broadly speaking, is any resin suitable for use in injection molding or resin transfer molding. Such resins will be easily recognized by the skilled person and are therefore not listed except for the purpose of illustration. The resin should preferably be a thermosetting resin, such as epoxy resins, polyester resins, polyimide resin or cyanate ester resin.

As stated, it is also possible to embed any desired element, which has no structural effect, e.g., on the strength or other mechanical properties of the bobbin, such as filling materials. One such suitable element may comprise, for instance, electric heating elements. Bobbins comprising heating elements are conveniently used in order to maintain the temperature within a desired range, e.g., in cold areas, where the fiber wound thereon, e.g., an optical fiber, may suffer from temperature changes outside a given range.

The empty space provided within the gap created by the two parts of the mold is the volume which is not taken by the fibers and fillings, and includes any volume within the winding, between the different layers and within fillings, such as felt or fabric, which can be practically filled with resin during the injection process.

The injection molding process does not substantially differ from known injection molding or resin transfer molding of other articles. Representative injection pressures for the resin are up to 5 bars, the absolute pressure at the vacuum port is of the order of 1 mBar, and the temperature of the mold is maintained at a level of up to about 200° C. Of course, it is important to seal the mold so that there are no pressure losses at the connection between the parts of the mold, as will be further discussed below.

The invention is also directed to a bobbin made essentially or partially of a curable resin, which bobbin is produced by:

a) providing a mold consisting of a male portion and of a female portion, the gap left between the said female and the said male portions, in their operational mounted position, being essentially of the shape and dimensions of the bobbin which it is desired to produce, the said mold being provided with a resin inlet and vacuum port in communication with the said gap;

b) laying on the surface of the male part of the mold, or winding thereon, any element or material which it is desired to embed within the resin;

c) inserting the male part of the mold into the female part thereof and securely connecting the said two parts, the said two parts, when connected, being essentially sealed against pressure low along their connection;

d) causing a curable resin to flow into the said gap through the resin inlet, while applying a vacuum at the vacuum port, until the empty space provided within the said gap is substantially entirely filled with resin;

e) allowing the resin to solidify; and f) opening the mold and removing the bobbin from the male part thereof.

According to a preferred embodiment of the invention, the inner surface of the female part of the mold is grooved, the grooves being the mirror image of the grooves which it is desired to produce on the surface of the bobbin.

The invention also encompasses a mold for the manufacture of a bobbin made essentially or partially of a curable resin, comprising a male portion and a female portion, the gap left between the said female and the said male portions, in their operational mounted position, being of the shape and dimensions of the bobbin which it is desired to produce, the said mold being provided with a resin inlet and vacuum port in communication with the said gap.

As stated above, it is preferred—but not imperative—that the inner surface of the female part of the mold be grooved, the grooves being the mirror image of the grooves which it is desired to produce on the surface of the bobbin.

The above and other characteristics and advantages of the invention will be better understood through the following illustrative and non-limitative description of preferred embodiments thereof.

DETAILED DESCRIPTION OF PREFERRED EMBODIMENTS

Figure 1:
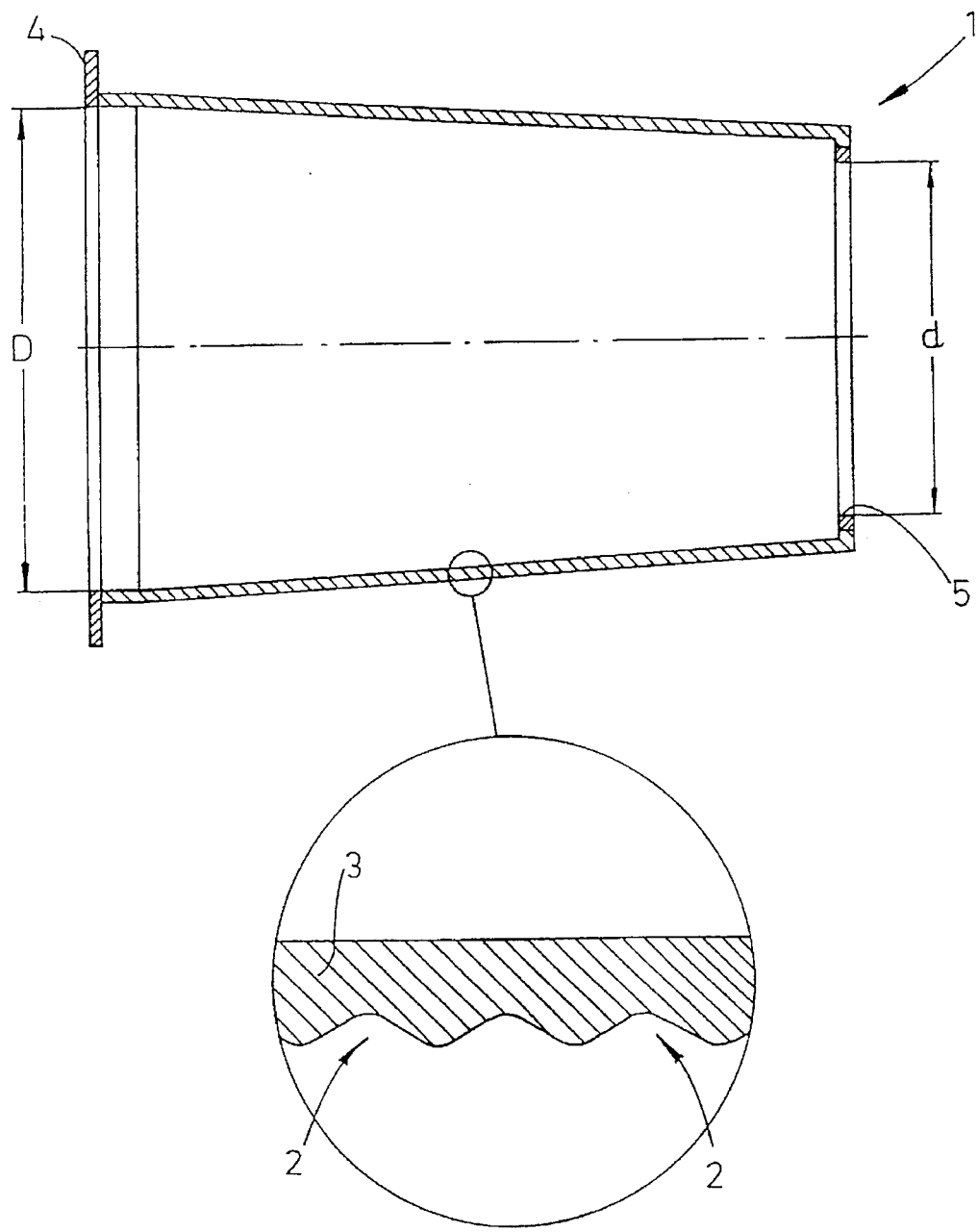
FIG. 1 is an axial cross-section of a bobbin suitable for use with an optical fiber.

FIG. 1 schematically shows an axial cross-section of a bobbin suitable for use with an optical fiber. The bobbin, generally indicated by numeral 1, is frusto-conical in shape, and has a large inner diameter, D, and a small inner diameter, d. The bobbin comprises a surface on which grooves 2 have been made, as seen in the enlarged portion of the figure. The cone wall 3 and the grooved surface 2 may be made of the same material and integral with one another, as in the case of aluminum, or may be made of different materials, as in the case of a composite material.

A disk 4 is connected at diameter D, which disk is used as a flange for connecting the canister to its housing. Of course, other shapes of flanges can also be used. If the bobbin is made of a soft material, it is often desirable or necessary to provide an inserted ring 5 at smaller diameter d, as shown in the figure, for the purpose of imparting rigidity and strength to the bobbin.

Figure 2:
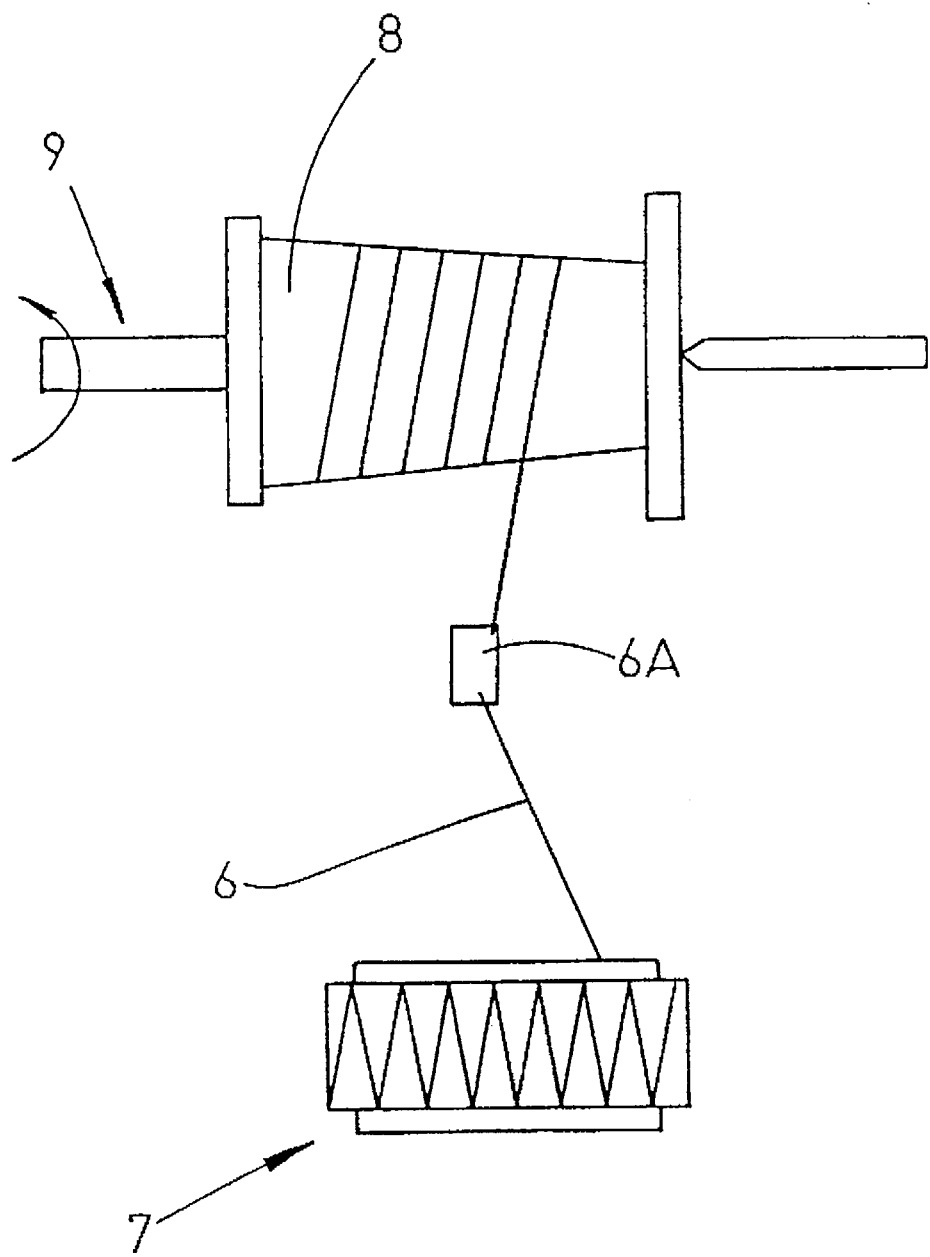
FIG. 2 illustrates the "filament winding" technique.

Many methods are known in the art for manufacturing articles made of composite materials, and these methods are therefore not discussed herein in detail. By way of illustration, however, FIG. 2 shows the so-called "filament winding" technique. According to this technique, a fiber 6 from a fiber spool 7 is wound onto a frusto-conical winding material 8, which can be made of any suitable material, e.g., aluminum. This winding is effected under the control of a fiber payout mechanism, schematically indicated by 6A in the figure. The fiber, which can be of any suitable type, depending on the properties required, e.g., a carbon fiber or a synthetic fiber, is wound under controlled tension on the body 8, by the rotation of axis 9, which rotates in the direction of the arrow. The fiber can be impregnated with a resin, or the resin can be applied after the fiber has been wound. After this stage is completed, the main body of the bobbin is ready, and there remains to provide the grooved surface thereon, by any of the known techniques. The bobbin can be easily removed from the winding mandrel, because of its frusto-conical shape, simply by forcing it out in the direction of the smaller diameter.

In addition to the said fibers, filling material can be positioned within the body of the bobbin, e.g., between different layers of fibers. Such filling may include, e.g., felt, fabric or electric heating elements. The felt can be used, e.g., for obtaining a good homogenization of resin flow within the mold. The filling, e.g. felt or fabric, may be used to tailor the mechanical properties of the resulting composite bobbin, and the heating elements can be embedded for the purpose of obtaining desired temperatures in the bobbin in cold weather.

Figure 3A:
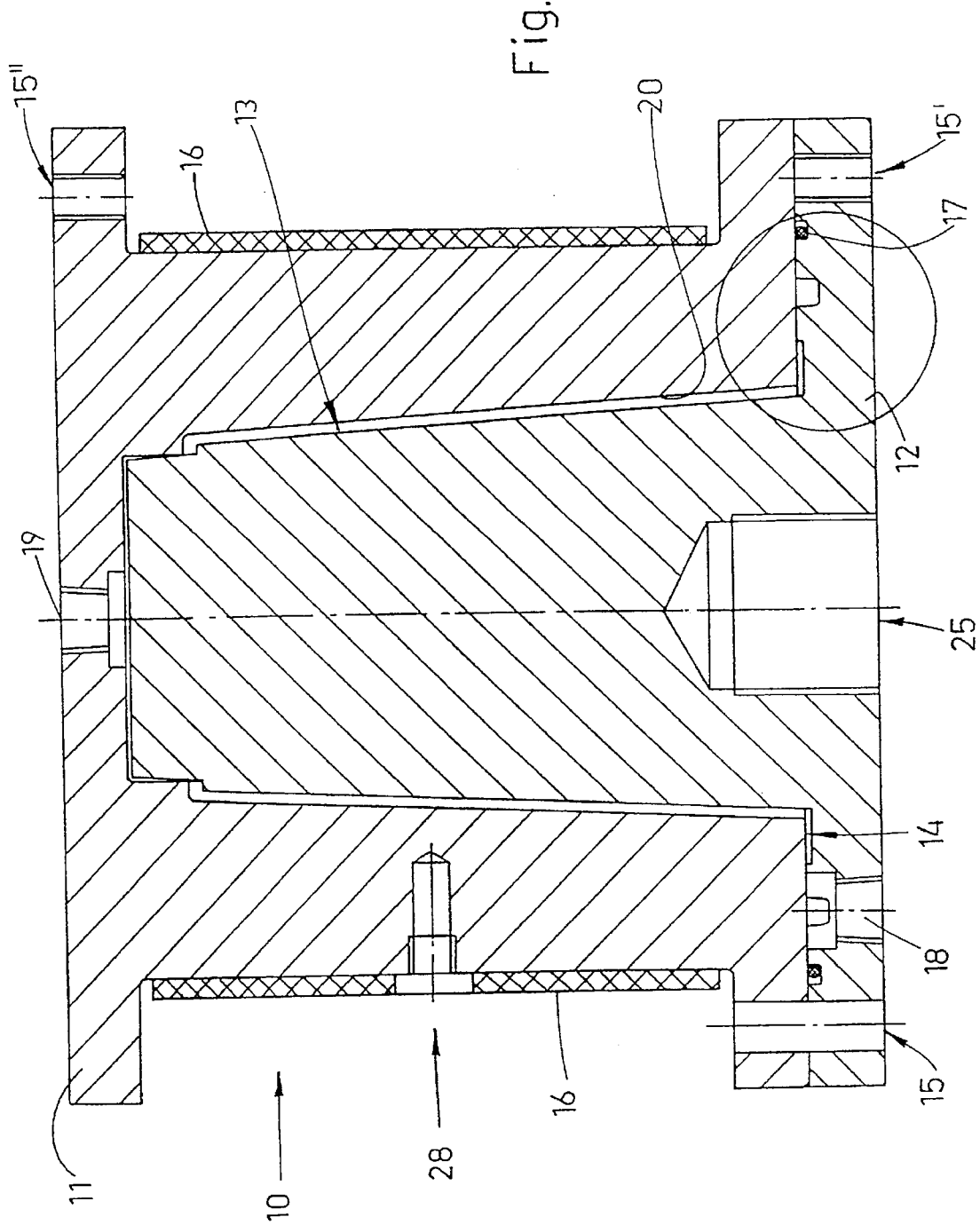
FIG. 3A shows a mold, according to a preferred embodiment of the invention.

Turning now to FIG. 3A, an apparatus for manufacturing a bobbin, according to one preferred embodiment of the invention, comprises a two-piece mold 10. The mold 10 is made of a female portion 11 and a male portion 12. In the case in which the bobbin is a composite bobbin made, e.g., by the filament winding technique of FIB. 2, male portion 12 of mold 10 can be used directly as the winding mandrel.

The mold 10 is designed so as to leave between female part 11 and male part 12 a gap 13, which essentially corresponds to the size and shape of the bobbin which it is desired to produce. Additionally, according to this embodiment of the invention, a gap 14 is also provided, for the purpose of creating anchoring means integral with the bobbin, as will be more fully explained hereinafter.

During the process the female and male parts of the mold are kept together by any suitable means, e.g., by bolts (not seen in FIG. 3A), passing through openings 15–15". Alternative means for this purpose are, e.g., clamps or a press. Heating elements can be provided at any suitable location, e.g., within the winding mandrel or around the outer wall of the mold. In the embodiment of FIG. 3A, electrical heating elements 16 are provided around the mold. Other heating methods can also be used, e.g., using heating fluids or heating within an oven.

Temperature can be measured by a suitable probe inserted in well 28. Opening 25 is provided for insertion of the rotating axis of the mandrel (9 in FIG. 2).

Figure 3B:
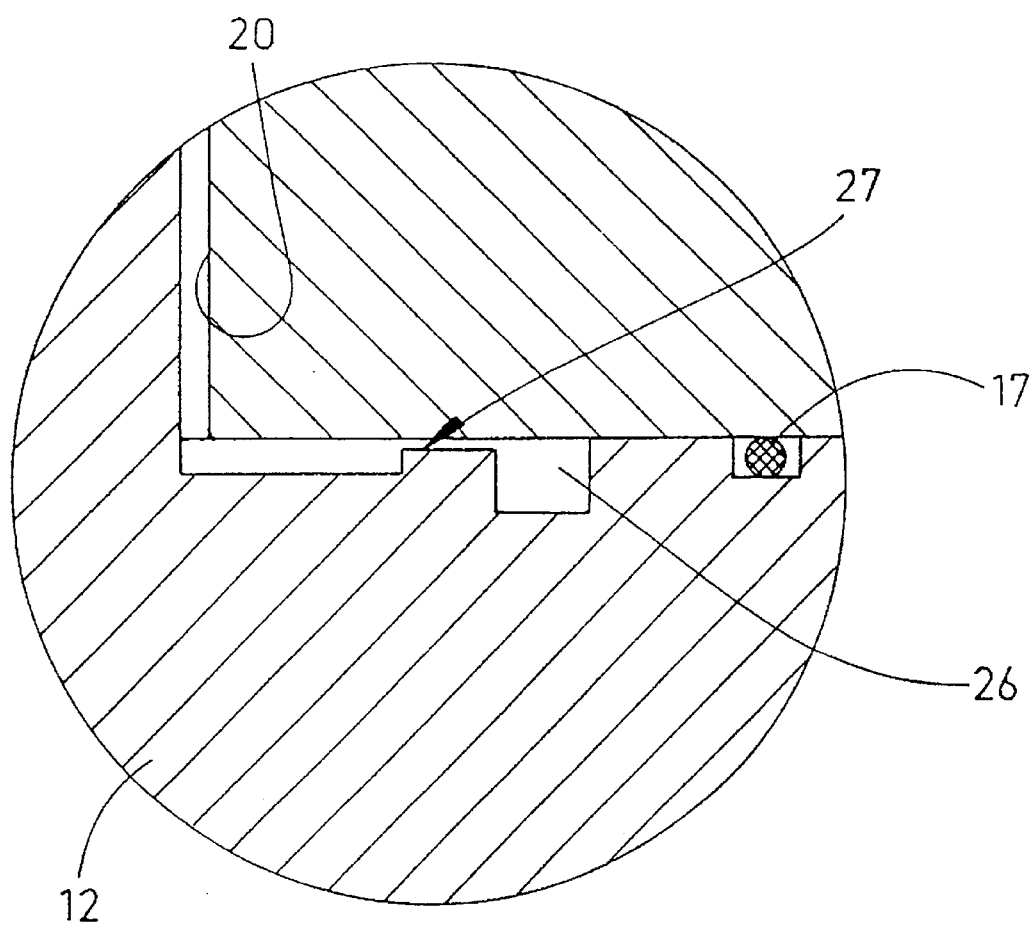
FIG. 3B is an enlarged view of the circled portion of FIG. 3A.

FIG. 3B is an enlarged view of the circled portion of the mold of FIG. 3A. From this enlargement it is possible to see the channel 26 in which the resin flows around the mandrel, after its injection into inlet port 18 (FIG. 3A). From channel 26 the resin flows into restricted channel 27 and then into gap 20 within the mold.

The production steps are as follows:

I. All desired fillings are provided around the male part 12, such as fibers, blankets, electrical heating elements, etc. (or no filling at all), taking care that they thickness does not exceed that of empty space 13.

II. Male part 12 is inserted into female part 11, as in FIG. 3, and the two parts are securely connected, e.g., by bolting.

III. Vacuum is maintained within the mold by appropriate sealing means, e.g., by gasket 17 provided at the interface between the two parts of the mold.

IV. Resin is caused to flow into the mold through inlet 18, by the action of positive pressure as well as by applying a vacuum to vacuum port 19. Heat is applied, e.g., by jacket 16, both to aid flow of the resin through empty space 13 and to promote solidification (polymerization) of the resin.

V. Once the whole empty volume within gap 13 is filled with resin, inlet 18 and outlet 19 are closed and the resin is cured and allowed to solidify, to form the body of the bobbin.

VI. The male and female parts of the mold are separated, and the bobbin is removed from the winding mandrel. This may require heating/cooling cycles, in order to provide temporary differences in expansion of the various materials which allow for an easier separation. The inner surface 20 of female part 11 of the mold 10 is grooved, and consequently any surface created against it will also be grooved. Thus the male part 12 can be screwed out of the female part 11. However, any other arrangement, such as two-parts molds, inner separable sleeve, or the like, which permit to separate the bobbin from the mold, is acceptable. Many different methods will be apparent to the skilled person, and therefore are no discussed here for the sake of brevity.

Likewise, the actual heating method is not important, and the operation can be entirely carried out in an oven, or entirely by heating elements as in FIG. 3, or by a combination of the two and/or of other methods. The heating procedures, which are conventional, are not described in detail, for the sake of brevity.

If it is desired to embed heating elements in the bobbin, they can be wound around the winding mandrel, and electric contacts can be allowed to terminate near the surface of the bobbin, preferably near an end, where they can be easily uncovered. Alternatively, a recess can be provided in the mold to house the electric contact outside the plane of the bobbin surface.

Figure 4:
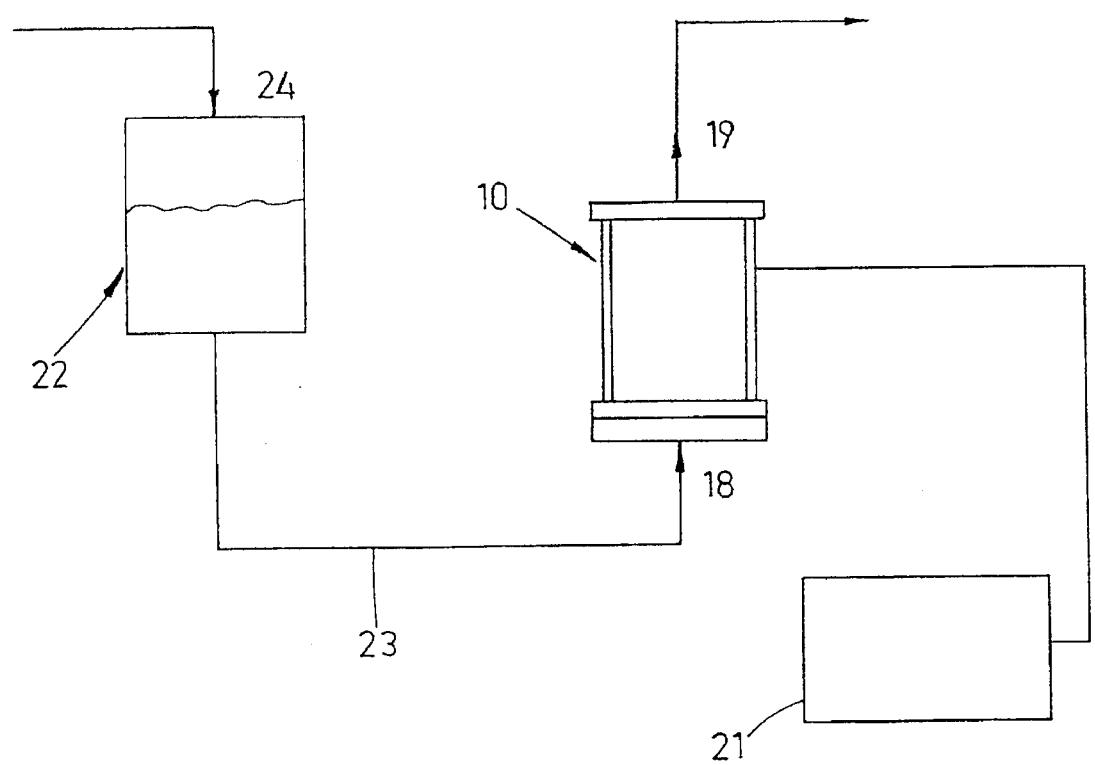
FIG. 4 schematically illustrates a manufacturing system according to one embodiment of the invention.

FIG. 4 schematically illustrates a whole injection system. The mold 10 of FIG. 3 is connected to a vacuum line 19 on one side, and to resin inlet 18 on the other. A temperature controller 21 ensures that the desired temperature is maintained. A resin reservoir 22 is connected to inlet 18 of mold 10 through line 23. Resin flow through line 23 is obtained, e.g., by applying an air pressure on the surface of the resin within reservoir 22, through air pressure inlet 24. Alternatively, of course, the resin can be injected by using a pump or a piston or other displacemenet device (not shown).

In order to facilitate the distribution of the resin within gap 13 (FIG. 3), it is possible to provide layers of porous material, or other sections of lower resistance to flow, through which the resin can easily flow.

As will be apparent to the skilled person, the invention provides many substantial advantages: it permits to manufacture bobbins by a process which is attractive from the industrial point of view; it provides a grooved surface and avoids the need for surface machining; it permits to manufacture bobbins made of resins containing additional elements, e.g., heating elements, or made of a single material or of composite material, without the need to alter the mold or other parts of the manufacturing apparatus. Thus, it affords considerable flexibility at low cost.

The above description of preferred embodiments has been provided for the purpose of illustration, and is not intended to limit the invention in any way. Many different molds, productions systems and shapes can be used, and different construction materials can be employed for the bobbin and the mold, all without exceeding the scope of the invention.

I claim:

1. A method of manufacturing a bobbin made essentially or partially of a curable resin, comprising the steps of:

a) providing a mold having a male portion and a female portion, the male and female portions together defining a gap of the shape and dimensions of the bobbin, the mold being provided with a resin inlet and vacuum port in communication with the gap, said female portion having a grooved inner surface, grooves on the grooved inner surface being a mirror image of grooves to be produced on a surface of the bobbin;

b) laying on a surface of the male portion of the mold, or winding thereon, an element or material;

c) inserting the male portion of the mold into the female portion thereof and securely connecting the two portions, when connected, being essentially sealed against pressure loss along their contact surfaces;

d) causing a curable resin to flow into the gap through the resin inlet and around the element or material which is on the surface of the male portion, while applying a vacuum at the vacuum port, until an empty space provided within the gap is substantially entirely filled with resin thereby embedding the element or material within the resin;

e) allowing the resin to solidify to produce the bobbin having grooves;

f) subjecting the mold to a heat treatment which results in a temporary difference in the expansions of the materials constituting the mold and the bobbin, the heat treatment being applied so as to facilitate separation of the bobbin from the mold; and g) separating the bobbin from the female portion and/or the male portion while separation is facilitated due to the heat treatment.

2. A method according to claim 1, wherein the material which is embedded within the resin comprises one or more fibers and felt.

3. A method according to claim 2, wherein the fiber is selected from among carbon fibers, aramide fibers, glass fibers, ceramic fibers and polyethylene fibers.

4. A method according to claim 1, wherein the resin is a thermosetting resin.

5. A method according to claim 4, wherein the resin is selected from epoxy resins, polyester resins, polyimide resins or cyanate ester resins.

6. A method according to claim 1, wherein the element which is embedded within the resin comprises electric heating elements.

7. A method according to claim 1, wherein an injection pressure of the resin is up to 5 bars.

8. A method according to claim 1, wherein an absolute pressure at the vacuum port is about 1 mBar.

9. A method according to claim 1, wherein the mold is maintained at a temperature of up to 200° C. during step d.

10. A method according to claim 1, wherein the gap between the female portion of the mold and the male portion of the mold comprises a frusto-conical part and an annular part communicating with a wider base of the frusto-conical part, and the resin is caused to flow from the resin inlet through said annular part to said frusto-conical part.

11. A method according to claim 1, wherein the gap between the female portion of the mold and the male portion of the mold comprises a frusto-conical part and an annular part communicating with a wider base of the frusto-conical part, and the resin is caused to flow from the resin inlet through said annular part to said frusto-conical part through a restricted passage.

* * * * *

UNITED STATES PATENT AND TRADEMARK OFFICE
CERTIFICATE OF CORRECTION

PATENT NO. : 5,630,971

DATED : May 20, 1997

INVENTOR(S) : Zohar Ophir

It is certified that error appears in the above-identified patent and that said Letters Patent is hereby corrected as shown below:

In column 4, line 22: delete the first occurance of "material" and replace with --mandrel--.

In claim 3, column 6, line 64: "aramide" should read --aramid--.

Signed and Sealed this

Twenty-fourth Day of February, 1998

*Attest:*

BRUCE LEHMAN

*Attesting Officer*     *Commissioner of Patents and Trademarks*